United States Patent [19]
Croucher et al.

[11] 3,708,648
[45] Jan. 2, 1973

[54] MULTI-MODE STRUCTURAL SPOTWELD MONITOR

[75] Inventors: William C. Croucher, Englewood; Russell A. Chihoski, Littleton, both of Colo.

[73] Assignee: Martin Marietta Corporation, New York, N.Y.

[22] Filed: June 18, 1971

[21] Appl. No.: 154,379

[52] U.S. Cl. ................................ 219/109, 219/117
[51] Int. Cl. ................................................ B23k 9/10
[58] Field of Search....219/109, 110, 114, 69 C, 131, 219/135, 117

[56] References Cited

UNITED STATES PATENTS

| | | | |
|---|---|---|---|
| 3,585,347 | 6/1971 | Needham | 219/110 |
| 3,569,659 | 3/1971 | Benton | 219/117 |
| 3,609,285 | 9/1971 | Scarpelli | 219/109 |
| 3,404,252 | 10/1968 | Michael | 219/110 |
| 3,400,242 | 9/1968 | Waller | 219/110 |
| 3,191,441 | 6/1965 | Erikson | 219/110 X |
| 3,417,221 | 12/1968 | Hayward | 219/109 |
| 3,449,541 | 6/1969 | Wilcox et al. | 219/110 X |
| 3,558,849 | 1/1971 | Catherall et al. | 219/110 |
| 2,472,368 | 6/1949 | Cox et al. | 219/86 |

*Primary Examiner*—J. V. Truhe
*Assistant Examiner*—Gale R. Peterson
*Attorney*—Phillip L. De Arment et al.

[57] ABSTRACT

Disclosed herein is a multi-mode spotweld monitor which selectively monitors one or more of a plurality of different weld quality indicators. Provision is made for the recording of the indicators in both analog and digital form to provide readily usable data for weld quality determinations. Further, the multi-mode monitor need not be adjusted to compensate for variations in the thickness of different workpieces and/or for variations in electrode lengths due to wear.

7 Claims, 3 Drawing Figures

INVENTORS
WILLIAM C. CROUCHER
RUSSELL A. CHIHOSKI

BY Sughrue, Rothwell, Mion, Zinn & Macpeak
ATTORNEYS

MULTI-MODE STRUCTURAL SPOTWELD MONITOR

BACKGROUND OF THE INVENTION

The invention relates to welding apparatus and more particularly to a monitoring system for measuring and recording a plurality of weld quality indicators.

A recurring problem in the welding art is control of a welding machine such that it provides consistent quality welds. Obtaining consistent quality welds is difficult because of numerous invisible and varying factors, such as the characteristic of the workpiece upon which the welding is to be carried out, the condition of the welding electrodes, fluctuations in welding current and electrode pressure. Therefore, it is necessary to make periodic tests of the welds in order to be assured that they meet certain standards of quality.

An early method for testing weld quality was to randomly select workpieces which have been subjected to the welding process and to submit these pieces to destructive tests. Such tests were found to be unsatisfactory in that they were both expensive and time consuming. Further, there was no absolute assurance that production welds satisfied the weld quality requirements.

To overcome the inherent problems of destructive testing, researchers have developed various non-destructive tests. These tests not only provide a indication of weld quality without destroying the workpieces tested but also provide for the continuous monitoring of production welds. Examples of such non-destructive weld monitoring systems may be found in the U.S. Pats. to Sciaky, Nos. 2,851,583 and 2,851,584; Haywood, No. 3,417,221; Waller, No. 3,400,242 and Clark, No. 2,370,009.

To create a spotweld, the workpiece is clamped between two electrodes and heated by a flow of current therethrough. As the workpiece begins to heat, it expands to some maximum point, termed herein the maximum expansion point. The workpiece, in the area of the electrodes then begins to melt. In conventional welders one of the electrodes is movable so that as the workpiece expands the movable electrode travels away from the fixed electrode. After the maximum expansion point is reached and the workpiece begins to melt, the movable electrode travels towards the fixed electrode such that the separation between electrodes in now less than the separation which existed at the start of the welding cycle. At the end of the welding cycle, that is when the welding current ceases, the workpiece cools to form an essentially invisible bond between the two pieces which comprise the workpiece. The position of the movable electrode at its closest point to the fixed electrode during the weld cycle will be termed the set-down point. The initial position of the movable electrode with respect to the fixed electrode will be termed the null point.

Prior weld monitors such as those described in the aforementioned patents utilize known correlations between weld quality and various measurable indicators such as the maximum workpiece expansion, the expansion rate of the workpiece and the distance between the set-down point and the null point.

However, each of the prior monitoring systems has a common problem. Each requires a critical adjustment of the monitoring apparatus when the material thickness is changed or when the electrodes wear. Further, none of the prior monitoring systems is capable of multi-mode operation. That is, no single one of the prior systems has the capability of selectively measuring and recording a plurality of different quality indicators such as expansion rate, maximum expansion and electrode travel to the set-down point.

SUMMARY OF THE INVENTION

The present invention overcomes the difficulties with the prior weld monitors by providing a monitor which automatically adjusts for changing workpiece thicknesses and electrode wear. Further, the monitor of this invention is provided with a multi-mode capability. Basically, the system of this invention can operate in any one of three modes. First, the system has the capability of simultaneously measuring the workpiece expansion and the expansion rate. Second, the system has the capability of measuring the electrode travel from the null point to the set-down point while measuring either the expansion rate or the set-down rate. Finally, the same system has the capability of measuring the total distance between the maximum expansion point and the set-down point.

To provide automatic compensation for workpiece thickness variations and electrode wear, the linear motion of the movable welding electrode is sensed by a linear differential transformer. Variations in material thickness or electrode wear are automatically compensated for in the following manner. First, the output of the differential transformer is sensed prior to the beginning of a weld cycle but after the electrodes have been placed in operable relation with the workpiece. Second, the output of the transformer is sensed when a predetermined condition, such as maximum expansion, has been detected. By subtracting the first value from the second value, travel of the movable electrode can be determined relative to the position of the electrodes at the null point.

Multi-mode operation is provided by utilizing unique circuitry selectively interconnected by means of a mode switch. The detected weld quality indicators are recorded using an analog recorder, a digital voltmeter with a display and printer and a digital pulse counter with a display and printer. Further, a "go/no-go" indicator is provided to provide an instantaneous indication of a good or bad weld. The multi-mode characteristics of the invention provide a weld engineer with numerous weld quality indicators, any one or more of which can be measured and recorded at the engineer's discretion.

DETAILED DESCRIPTION OF THE PREFERRED EMBODIMENT

The instant invention provides a spotweld monitoring system for measuring and recording the quality of spotwelds made by conventional welding machines. A conventional welding machine is diagrammatically illustrated in FIG. 1. It should be understood that the representation of the spotwelder is for explanatory purposes only and the structure shown is not intending to be limiting upon the specific invention. It is further understood by those skilled in the art that any of the many conventional spot-welding machines may be used with the monitoring system disclosed hereinbelow.

Figure 2:
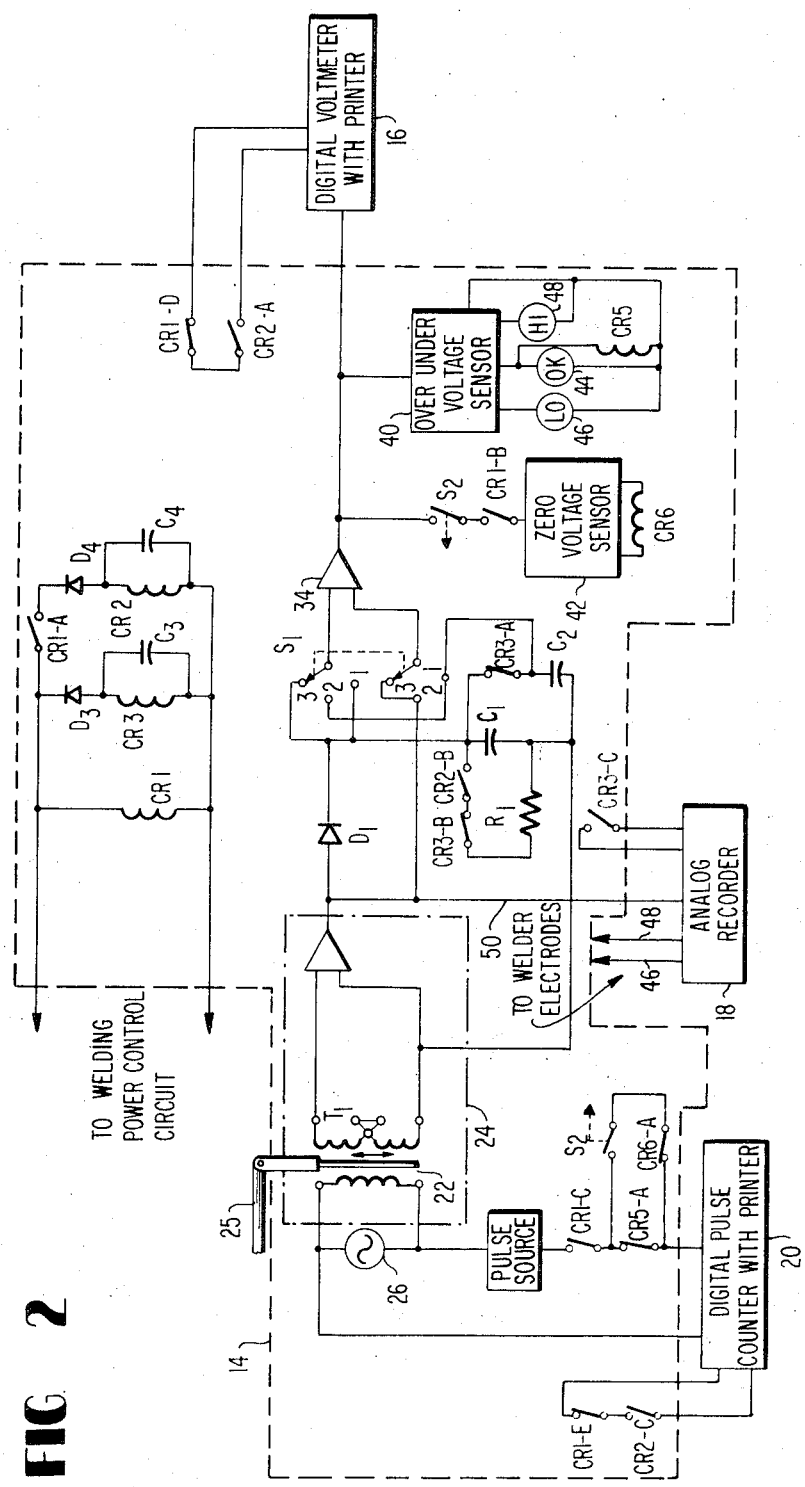
FIG. 2 illustrates, in schematic form, the circuitry of the weld monitor of the instant invention.

The workpiece which includes pieces 8 and 10 is pressed between electrodes 4 and 6. Electrode 6 is attached to a movable support arm 7, movement of support 7 being provided by arm 12. The monitor of this invention, which will be described in more detail with reference to FIG. 2, is shown generally at 14. Recording of the measured weld quality indicators is provided by a digital voltmeter with display and/or printer 16, analog recorder 18 and digital pulse counter with display and/or printer 20 coupled to the monitor circuitry through busses 21, 23 and 27. Digital voltmeters, analog recorders and digital pulse counters which may be used with this invention are generally known in the art.

Figure 1:
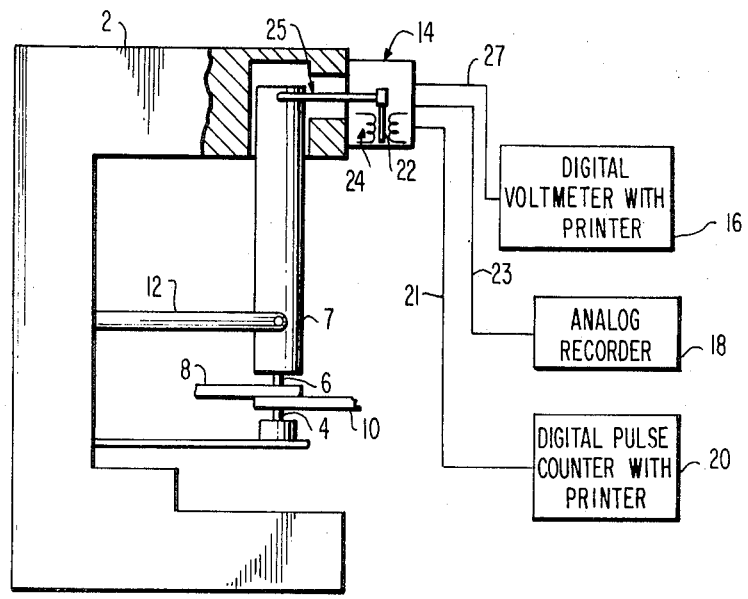
FIG. 1 is a diagram of a conventional welder showing its relationship to the monitor of this invention.

Monitor 14 automatically compensates for electrode wear and workpiece thickness variations by using a differential transformer shown schematically in FIG. 1 at 24. Such transformers are conventional. An example of a differential transformer which can be used with the monitoring system of this invention is the Sanborn Linearsyn differential transformer made and sold by Sanborn Instruments Division of the Hewlett - Packard Co. In operation, the transformer 22 detects the movement of electrode 6 through linkage 25 coupled to transformer core 22. The movement of the core 22 is proportional to the movement of electrode 6. Since the output of the transformer can be correlated to the position of movable core 24, the output of the transformer can be correlated to the movement of electrode 6.

Operation of the monitor 14 in each of its modes of operation will be described with reference to FIGS. 2 and 3. The detailed circuitry of the monitor is illustrated in FIG. 2. The section of this circuitry designated generally by the numerial 14 corresponds to the circuitry enclosed in box 14 illustrated in FIG. 1.

The circuitry shown has the capability of accurately measuring several parameters which are related to the quality of spotwelds produced between two pieces of metal. Regardless of the mode of operation, the device provides an analog record of the expansion and set-down of the workpiece as the spotweld is being produced, along with a record of the welder voltage or current. In addition, the device has the capability of printing out the rate of the expansion as well as the rate of set-down. Further, the device can produce a printout representing electrode travel from the null point to the maximum expansion point or the set-down point and the distance between the maximum expansion point and the set-down point.

Figure 3:
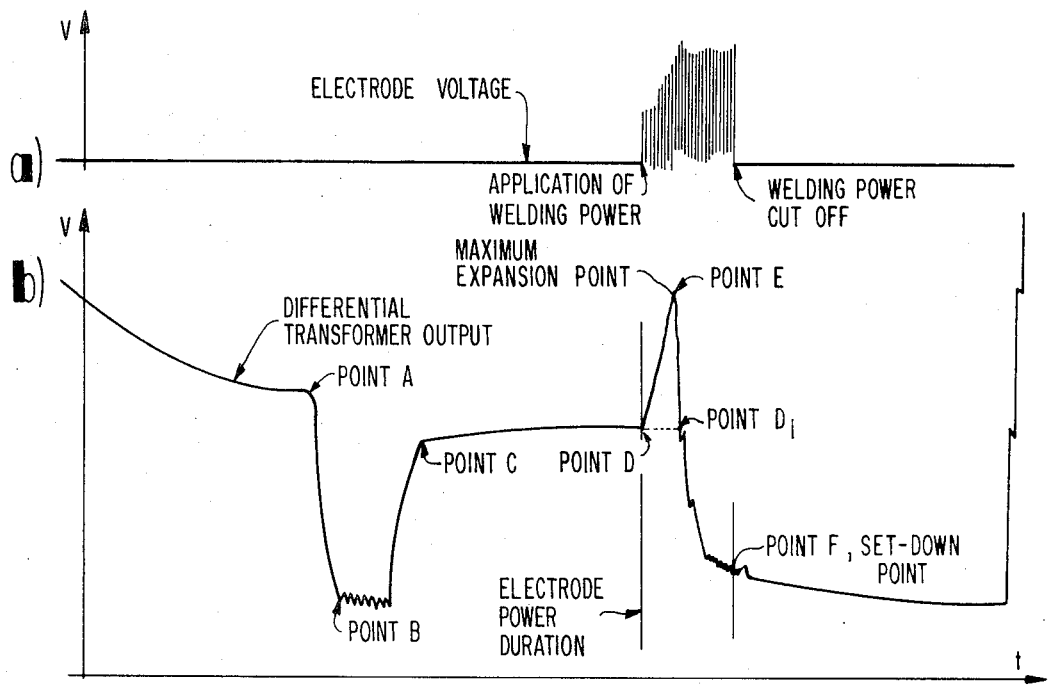
FIG. 3 represents electrode voltage verses time and the movement of the electrode with respect to time in terms of the output of the differential transformer.

Waveform $b$ in FIG. 3 is a graph of the output of the differential transformer as recorded by analog recorder 18 with the ordinate representing a potential proportional to the separation between the welder electrodes. When the workpiece is placed in the welder, the movable electrode is moved into contact with the workpiece. When this condition occurs the output of the transformer is as illustrated at point A. Clamping pressure is now applied so that the two pieces which comprise the workpiece are properly seated with respect to each other. Clamping pressure causes the movable electrode 6 to move closer to the fixed electrode 4 as represented by point B. When the clamping pressure is released the movable electrode moves away from the fixed electrode to point C. The electrode 6 remains in this position until the initiation of a welding cycle. Point D, representing the relative positions of the electrodes at the beginning of a welding cycle corresponds generally to point C. As the workpiece melts and expands under the influence of welding current, electrode 6 moves to a position corresponding to point E relative to the null point D. Point E represents the maximum expansion point. The workpiece now begins to solidify and electrode 6 moves towards the fixed electrode 4. At point F which corresponds to the set-down point electrode voltage is cut off.

In one mode of operation, termed Mode 1, the monitor provides an indication of the maximum workpiece expansion as well as the rate of expansion. Mode 1 operation is initiated by moving mode switch $S_1$ to position 1 and switch $S_2$ to its open position. The electrodes are placed in operable contact with the workpiece causing an output from the differential transformer equivalent to point D. It should be noted at this point that the position of point D will vary for varying workpiece thickness and for electrode wear. However, since what is important is the distances between point D and point E, points $D_1$ and F and points E and F, the initial position of point D relative to ground potential is immaterial.

Turning now the description of operation of the circuitry of FIG. 2 in Mode 1, capacitances $C_1$ and $C_2$ charge to some value representing the initial separation between electrodes at the start of a welding cycle. When welding power is supplied relays CR1, CR3 and CR4 are energized. Relay CR1 is energized only so long as weld power is supplied. Relay CR3 is provided with a 2-second delay before de-energizing in response to cessation of welding power. This delay is represented diagrammetically by capacitance $C_3$. Energization of relay CR1 closes normally open relay switch CR1-A to energize relay CR2. Relay CR2 will de-energize five seconds after switch CR1-A opens upon the de-energization of relay CR1. The 5-second delay is represented by capacitor $C_4$. In addition, when relay CR1 is energized the digital pulse counter 20 is energized through switch CR1-C. Switch CR5-A associated with relay CR5 is normally closed thus permitting the pulse counter to be energized. CR1-D opens to prevent the digital voltmeter 16 from printing out or displaying the output of differential amplifier 34. Finally, switch CR1-E opens to prevent the digital pulse counter 20 from printing out its stored count.

When relay CR3 is energized, its associated switch CR3-A opens to prevent further charge buildup on capacitance $C_2$ as the workpiece begins to expands. Thus, the charge on capacitance $C_2$ acts as a reference level for the weld quality measurements. That is, the potential stored on capacitance $C_2$ provides a reference voltage against which the potential across capacitance $C_1$ will be compared. Switch CR3-B opens to prevent discharging of the stored potential on capacitance $C_1$ through resistor $R_1$, while switch CR3-C closes to start the analog recorder.

Energization of relay CR2 causes switch CR2-A to close to ready a print command circuit in the digital voltmeter 16. Switch CR2-B closes but no change occurs because switch CR3-B is open. Switch CR2-C closes to arm a print command circuit in the digital pulse counter 20. Printouts from the digital pulse counter and the digital voltmeter do not begin at this point because switches CR1-E and CR1-D remain open with relay CR1 energized.

As the welding power is applied to the electrodes, the workpiece begins to expand causing the movable electrode to travel away from the fixed electrode. This movement causes an increase in the output voltage from the differential transformer 24 thus increasing the potential across capacitance $C_1$.

When the maximum expansion point is reached, the workpiece begins to solidify causing the electrode separation to decrease, with a resulting decrease in the differential transformer 24 output potential. However, capacitance $C_1$ retains its charge because blocking diode $D_1$ prevents the capacitance from discharging back into the differential transformer.

With mode switch $S_1$ in position 1 the potential across capacitances $C_1$ and $C_2$ provide two inputs to differential amplifier 34. The output of the differential amplifier is a potential equal to the difference between the potential stored on capacitances $C_1$ and $C_2$.

The output of the differential amplifier 34 is coupled to the over/under voltage sensor 40, the digital voltmeter 16, and, through switch $S_2$, to a zero voltage sensor 42. Since switch $S_2$ is open in Mode 1 operation, the zero voltage sensor plays no part in the monitoring of workpiece expansion or expansion rate. The digital voltmeter printer circuit continues to be disabled due to the fact that switch CR1-D remains opened. The over/under voltage sensor 40 is however responsive to the output of the differential amplifier 34.

The over/under voltage sensor unit is conventional and basically comprises storage means for storing a predetermined potential and a comparator means for determining when the output from the differential amplifier is greater than, less than, or equal to the stored predetermined potential. As the electrodes separate under the influence of the expanding workpiece, the output of the differential amplifier approaches the value of the stored predetermined potential. When the predetermined potential is reached, an indicator light 44 is energized. Should the output potential from the differential amplifier 34 exceed the predetermined voltage the HI indicator light 48 is energized. On the other hand should the voltage at the output of amplifier 34 not reach the predetermined value, the low indicator light remains energized. Assuming that the output of the differential amplifier 34 matches the stored predetermined value in the voltage sensor 40 relay CR5 is energized opening normally closed relay switch CR5-A to de-energize digital pulse counter 20. The stored count in the digital pulse counter is an indication of the expansion rate.

At the end of the welding cycle, the welding power is cut off causing the relay CR1 to be immediately de-energized. De-energization of the relay causes switch CR1-D to move to its normally closed position thus energizing the print circuit in the digital voltmeter 16. Recalling that the charge on capacitance $C_1$ has been retained constant at the potential representing the maximum expansion point and has not been decreased in response to electrode movement to the set-down point, the potential recorded in the digital voltmeter is the maximum value which has appeared at the output of the differential amplifier 34. This voltage value is correlatable to the distance the movable electrode has traveled to the maximum expansion point E.

The de-energization of relay CR1 also closes switch CR1-E causing the digital pulse counter printer circuit to be energized to cause the final count stored in the digital pulse counter to be printed out. This time represents the time it took the workpiece to expand a predetermined distance as represented by the stored predetermined voltage in voltage sensor 40. It should be noted that the printout value from the digital pulse counter is not necessarily the time it took for the weld to expand to the maximum expansion point. If the maximum expansion point was greater than the predetermined distance, the count in counter 20 does not represent the time for the electrode 6 to move to the maximum expansion point. It should be obvious however, that if desired the digital pulse counter can be caused to be de-energized at the maximum expansion point.

Relay CR3 opens after a 2-second delay shutting off the analog recorder by opening switch CR3-C. Further, de-energization of the relay CR3 causes switch CR3-A and CR3-B to close allowing capacitances $C_1$ and $C_2$ to discharge through resistor $R_1$ thereby resetting the system for the next welding operation.

To summarize system operation in Mode 1, the analog recorder which through lines 46 and 48 is coupled to the weld electrodes, prints out a graph of the electrode voltage as illustrated in graph $a$ of FIG. 3. Further, by coupling the recorder via line 50 to the output of the differential transformer 24, a graph of the differential transformer output is obtained. A digital readout of the output potential from the differential amplifier 34 which is proportional to the maximum separation between the two electrodes is obtained from digital voltmeter 16. In addition, a digital record is obtained of the time it took for the movable electrode to move a predetermined distance while a go/no-go indication of the weld quality is obtained using voltage sensor 40 with indicator lights 44, 46 and 48.

In a second mode of operation called Mode 2, the distance between the null point and the set-down point is determined. That is, the distance between point D and F is determined. The monitoring circuit is selectively placed into Mode 2 operation by moving mode switch $S_1$ to position 2 while continuing to maintain switch $S_2$ in its open position. When the weld electrodes are again placed in operable contact with the workpiece the output of the differential transformer 24 is a potential proportional to the separation of the welder electrodes. Capacitances $C_1$ and $C_2$ are again charged with an initial potential representing the initial electrode separation and the potential across capacitance $C_2$ is again used as a base line reference to the differential amplifier 34. That is, the charge on capacitance $C_2$ corresponds to point D on the graph $b$ of FIG. 3. Capacitance $C_1$ will play no part in this monitoring operation. When welding power is supplied to the electrodes, the relay operation is identical to that previously described with respect to Mode 1 operation. It should be noted that in Mode 2 operation the output from the differential transformer 24 bypasses the blocking diode $D_1$ and thus one input to the differential amplifier 34 increases as the workpiece expands and decreases to a point below point D as the workpiece melts. Since capacitance $C_2$ is blocked from discharging it retains a potential proportional to the initial separation of the electrodes. At the set-down point F welding power is cut off. It should be noted that in Mode 2 operation the analog recorder 18 operates in the same manner as in Mode 1 and the graph obtained is identical to the one obtain with respect to Mode 1. This is because the recorder is connected directly to the output of the differential transformer 24 and is therefore not affected by the position of the mode switch.

In Mode 2 operation as in Mode 1 the digital pulse counter under the control of the over/under voltage sensor 40 operates to determine the time it took the movable electrode to travel to a predetermined position. If sensor 40 is caused to retain the same predetermined voltage used in Mode 1 operation, the time it took to reach a predetermined position along the expansion travel of electrode 6 is determined. However, the over/under voltage sensor can be used to indicate whether the set-down point obtained was acceptable or not. To do this the predetermined stored potential is changed so that lamp 44 is energized when the output from amplifier 34 matches the stored potential representing the acceptable set-down point. It should be noted that when so operated, relay CR5 is energized at a time when electrode 6 has moved to the position equivalent to the acceptable set-down point. Since pulse counter 20 is caused to stop counting when relay CR5 is energized, the count in the counter represents the time it took for the electrode to move from the null point, through the maximum expansion point, to the predetermined acceptable set-down point.

Further, in Mode 2 operation the digital pulse counter can be used to determine the time required for the weld to expand to its maximum expansion point and be returned to its original thickness. For the pulse counter to count the time for the workpiece to expand and return to the null point $D_1$, the over/under voltage sensor 40 stores a predetermined potential corresponding to the predetermined expansion point. Further, switch $S_2$ is placed in its closed position. Thus, at the beginning of the weld cycle switches CR1-C and CR5-A are both closed energizing the digital pulse counter. When the predetermined expansion point has been reached, indicator light 44 is energized as is also relay CR5 opening switch CR5-A. However, with switch $S_2$ closed, zero voltage sensor 42 is energized through switch CR1-B. Relay CR6, coupled to the zero voltage sensor 42 remains de-energized until the output of the differential amplifier 34 returns to zero indicating that the electrode separation corresponds to the null point $D_1$. At this point relay CR6 is energized opening normally closed relay switch CR6-A stopping the digital pulse counter 20. When the welding power is again shut off the print circuit of the digital pulse counter 20 is energized by the closing of switch CR1-E energizing the printout circuit in counter 20 to record the time elapsed between points D and $D_1$.

Thus, during Mode 2, the digital voltmeter 16 records the position of the set-down point relative to the null point, while the digital pulse counter can be made to record either the time required for expansion to a predetermined expansion point, the time for the movable electrode to move from point D to a predetermined set-down point or the time required for the movable electrode to move from point D through the maximum expansion point to point $D_1$. Further, the over/under voltage sensor can operate in either of two modes, that of determining if the maximum expansion point corresponds to a predetermined value or if the set-down point corresponds to a predetermined value.

Another mode of operation denoted Mode 3 provides a measurement of the travel of the movable electrode from the maximum expansion point to the set-down point. Mode 3 operation requires that the mode switch $S_1$ be placed in position 3 and switch $S_2$ be placed in its open position. With mode switch $S_1$ in position 3 one input to the differential amplifier 34 is coupled to the capacitance $C_1$ while the second input is coupled directly to the output of differential transformer 24. Capacitance $C_2$ plays no part during Mode 3 operation. While welding power is supplied, capacitance $C_1$ stores a potential proportional to the maximum expansion of the workpiece as determined by the maximum separation between the electrodes. As the workpiece melts and the movable electrode moves closer to the fixed electrode, the output of the differential transformer 24 decreases. This decrease is seen by the input to amplifier 34 coupled directly to the transformer. Thus, the output from the differential amplifier 34 at the end of the weld cycle is a potential proportional to the distance between the maximum expansion point and the set-down point.

Again, analog recorder 18 records a graph similar to that illustrated FIG. 3 and is not influenced by the switching of mode switch $S_1$. In Mode 3 operation the predetermined voltage stored in the over/under voltage sensor 40 may be set to indicate the desired set-down point. The digital pulse counter 20 then counts the time for the movable electrode 6 to move from the null point through the maximum expansion point to the predetermined set-down point.

This can be seen from the following analysis of the circuit in Mode 3 operation. At the beginning of the weld cycle, switches CR1-C and CR5-A are both closed starting the digital pulse counter. The pulse counter continues to count until switch CR5-A opens in response to the energization of relay CR5. CR5 is energized upon the energization of the OK lamp 44 which occurs when the movable electrode has reached a point corresponding to a predetermined set-down point value.

Although the above described system incorporated relays, it should understood by those skilled in the art that the relays should be replaced by solid-state devices such as SCR's or transistors where fast reaction time is necessary or desired. Relays are used in the explanation to simplify the description of operation.

While the invention has been particularly shown and described with reference to the preferred embodiments thereof it will be understood by those skilled in the art that various changes in form and detail may be made therein without depart from the spirit and scope of the invention.

What is claimed is:

1. A weld monitor system for tracking the separation between a pair of welder electrodes, at least one of which is movable, a workpiece being positioned therebetween, the expansion, melting and solidification of the workpiece during a weld cycle causing variations in electrode separation, comprising;
   a. means for producing an output potential proportional to electrode separation,
   b. analog recorder means for recording said potential proportional to electrode separation,
   c. first and second storage means for storing potentials proportional to electrode separation,
   d. differential amplifier means and
   e. mode switch means for selectively interconnecting said first and second storage means, said means for producing an output potential and said differential amplifier means to selectively produce a potential at the output of said differential amplifier means proportional to either
      i. the varying separation of said electrodes during the portion of a welding cycle when the workpiece expands,
      ii. the varying separation of said electrodes during the entire weld cycle or
      iii. the varying separation of said electrodes between the point of maximum expansion and the end of the welding cycle.

2. The weld monitor of claim 1 further comprising; a digital voltmeter with recording means coupled to the differential amplifier and switch means for energizing said recording means at the end of a welding cycle, whereby there is recorded a potential proportional to either, the difference between electrode separation at the null point and at the maximum expansion point, the difference between electrode separation at the null point and at the end of the welding cycle or the difference between electrode separation at the maximum expansion point and at the end of the welding cycle.

3. The weld monitor of claim 2 further comprising, digital pulse counter means, voltage sensor means for indicating when the output from said differential amplifier reaches a predetermined potential and switch means responsive to said indication from said voltage sensor means for disabling said counter means.

4. The weld monitor of claim 3 further including a zero voltage circuit for indicating when the separation between the electrodes returns to the initial position assumed at the beginning of a weld cycle and switch means responsive to the output of the zero voltage circuit for disabling the counter means when the electrode separation returns to the initial position.

5. The weld monitor of claim 1 wherein said mode switch means comprises first and second movable contacts coupled to first and second inputs of said differential amplifier means, a first pair of fixed contacts coupled respectively to the first and second storage means, a second pair of fixed contacts coupled respectively to said second storage means and to the output of said means for producing a potential proportional to electrode separation and a third pair of fixed contacts coupled respectively to said first storage means and said output of the means for producing a proportional potential.

6. The weld monitor of claim 5 wherein said first and second storage means comprise respectively first and second capacitors, said capacitors being coupled to the output of said means for producing a potential proportional to electrode separation through a diode, further including switch means for charging said second capacitor at the beginning of a weld cycle and subsequently blocking the further charging thereof during the remaining portion of the weld cycle.

7. The weld monitor of claim 6 wherein said means for producing a potential proportional to electrode separation comprises a differential transformer.

* * * * *